US012530313B2

(12) United States Patent
Wang et al.

(10) Patent No.: US 12,530,313 B2
(45) Date of Patent: Jan. 20, 2026

(54) SYSTEM AND ARCHITECTURE OF PURE FUNCTIONAL NEURAL NETWORK ACCELERATOR

(71) Applicant: Huaxia General Processor Technologies Inc., Beijing (CN)

(72) Inventors: Lei Wang, Beijing (CN); Shaobo Shi, Beijing (CN); Zhaonan Meng, Beijing (CN)

(73) Assignee: Huaxia General Processor Technologies Inc., Beijing (CN)

( * ) Notice: Subject to any disclaimer, the term of this patent is extended or adjusted under 35 U.S.C. 154(b) by 0 days.

(21) Appl. No.: 17/623,329

(22) PCT Filed: Jul. 3, 2019

(86) PCT No.: PCT/CN2019/094512
§ 371 (c)(1),
(2) Date: Dec. 28, 2021

(87) PCT Pub. No.: WO2021/000282
PCT Pub. Date: Jan. 7, 2021

(65) Prior Publication Data
US 2022/0405221 A1 Dec. 22, 2022

(51) Int. Cl.
*G06F 15/80* (2006.01)
*G06F 9/38* (2018.01)

(52) U.S. Cl.
CPC ............ *G06F 15/80* (2013.01); *G06F 9/3822* (2013.01); *G06F 9/3836* (2013.01); *G06F 9/3853* (2013.01)

(58) Field of Classification Search
CPC ............ G06F 15/80; G06F 2213/2808; G06F 9/3822; G06F 9/3853; G06F 9/3836
(Continued)

(56) References Cited

U.S. PATENT DOCUMENTS 5,272,664 A * 12/1993 Alexander ............. G11C 5/066 365/230.03
5,887,175 A * 3/1999 Col ....................... G06F 9/4812 710/260
(Continued)

FOREIGN PATENT DOCUMENTS

TW 201901607 A 1/2019
TW 201911139 A 3/2019
(Continued)

OTHER PUBLICATIONS

Liang, Tailin, et al. "TCX: A RISC Style Tensor Computing Extension and a Programmable Tensor Processor." ACM Transactions on Embedded Computing Systems 22.3 (2023): 1-27. (Year: 2023).*
(Continued)

*Primary Examiner* — Keith E Vicary
(74) *Attorney, Agent, or Firm* — Zhong Law, LLC

(57) ABSTRACT

An accelerator circuit includes a control interface to receive a stream of instructions, a first memory to store an input data, and an engine circuit. The engine circuit includes a dispatch circuit to decode an instruction of the stream of instructions into a plurality of commands and a plurality of queue circuits. Each of the plurality of queue circuits supports a queue data structure to store a respective one of the plurality of commands decoded from the instruction, and a plurality of command execution circuits. Each of the plurality of command execution circuits is to receive and execute a command extracted from a corresponding one of the plurality of queues.

19 Claims, 6 Drawing Sheets

(58) Field of Classification Search
USPC .............................................................. 712/24
See application file for complete search history.

(56) References Cited

U.S. PATENT DOCUMENTS

| | | | | |
|---|---|---|---|---|
| 6,055,619 | A * | 4/2000 | North | G10H 7/002 712/35 |
| 9,841,974 | B2 * | 12/2017 | Wilson | G06F 9/3012 |
| 2005/0278502 | A1 * | 12/2005 | Hundley | G06F 9/4843 712/34 |
| 2011/0010531 | A1 * | 1/2011 | Henry | G06F 11/362 712/E9.032 |
| 2013/0151799 | A1 * | 6/2013 | Panavich | G06F 13/1621 711/E12.001 |
| 2015/0277924 | A1 | 10/2015 | Zappulla et al. | |
| 2017/0139708 | A1 | 5/2017 | Lees et al. | |
| 2017/0228234 | A1 * | 8/2017 | Feiste | G06F 9/3836 |
| 2018/0219797 | A1 | 8/2018 | Sen et al. | |
| 2019/0188136 | A1 | 6/2019 | Shah et al. | |
| 2022/0365782 | A1 * | 11/2022 | Wang | G06F 17/16 |

FOREIGN PATENT DOCUMENTS

| | | | |
|---|---|---|---|
| TW | 201911140 | A | 3/2019 |
| TW | 201921263 | A | 6/2019 |
| TW | 201921295 | A | 6/2019 |
| TW | 201923586 | A | 6/2019 |
| WO | 2019112959 | A1 | 6/2019 |

OTHER PUBLICATIONS

Liang, Tailin, Lei Wang, Shaobo Shi, John Glossner, and Xiaotong Zhang. "TCX: a programmable tensor processor." In 2022 Design, Automation & Test in Europe Conference & Exhibition (DATE), pp. 1023-1028. IEEE, 2022. (Year: 2022).*

ISA State Intellectual Property Office of the People's Republic of China, International Search Report Issued in Application No. PCT/CN2019/094512, Apr. 1, 2020, WIPO, 4 pages.

ISA State Intellectual Property Office of the People's Republic of China, Written Opinion of the International Searching Authority Issued in Application No. PCT/CN2019/094512, Apr. 1, 2020, WIPO, 5 pages.

Taiwan Office Action issued in Taiwan Application No. 109121403, mailed May 20, 2021, pp. 1-21.

* cited by examiner

SYSTEM AND ARCHITECTURE OF PURE FUNCTIONAL NEURAL NETWORK ACCELERATOR

CROSS-REFERENCE TO RELATED APPLICATIONS

The present application is the US national stage of PCT/CN2019/094512 filed on Jul. 3, 2019, the content of which is incorporated by reference in its entirety.

TECHNICAL FIELD

The present disclosure relates to hardware processor circuits and accelerator circuits, and in particular, to processor circuits and accelerator circuits that can execute pure functional instructions.

BACKGROUND

A processor is a hardware processing device (e.g., a central processing unit (CPU) or a graphic processing unit (GPU)) that implements an instruction set architecture (ISA) containing instructions operating on data elements. A tensor processor may implement an ISA containing instructions operating on tensors containing data elements. A tensor is a multi-directional data structure containing ordered scalar data elements. By operating on tensors containing multiple data elements, tensor processors may achieve significant performance improvements over scalar processors that support only scalar instructions operating on singular data elements.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
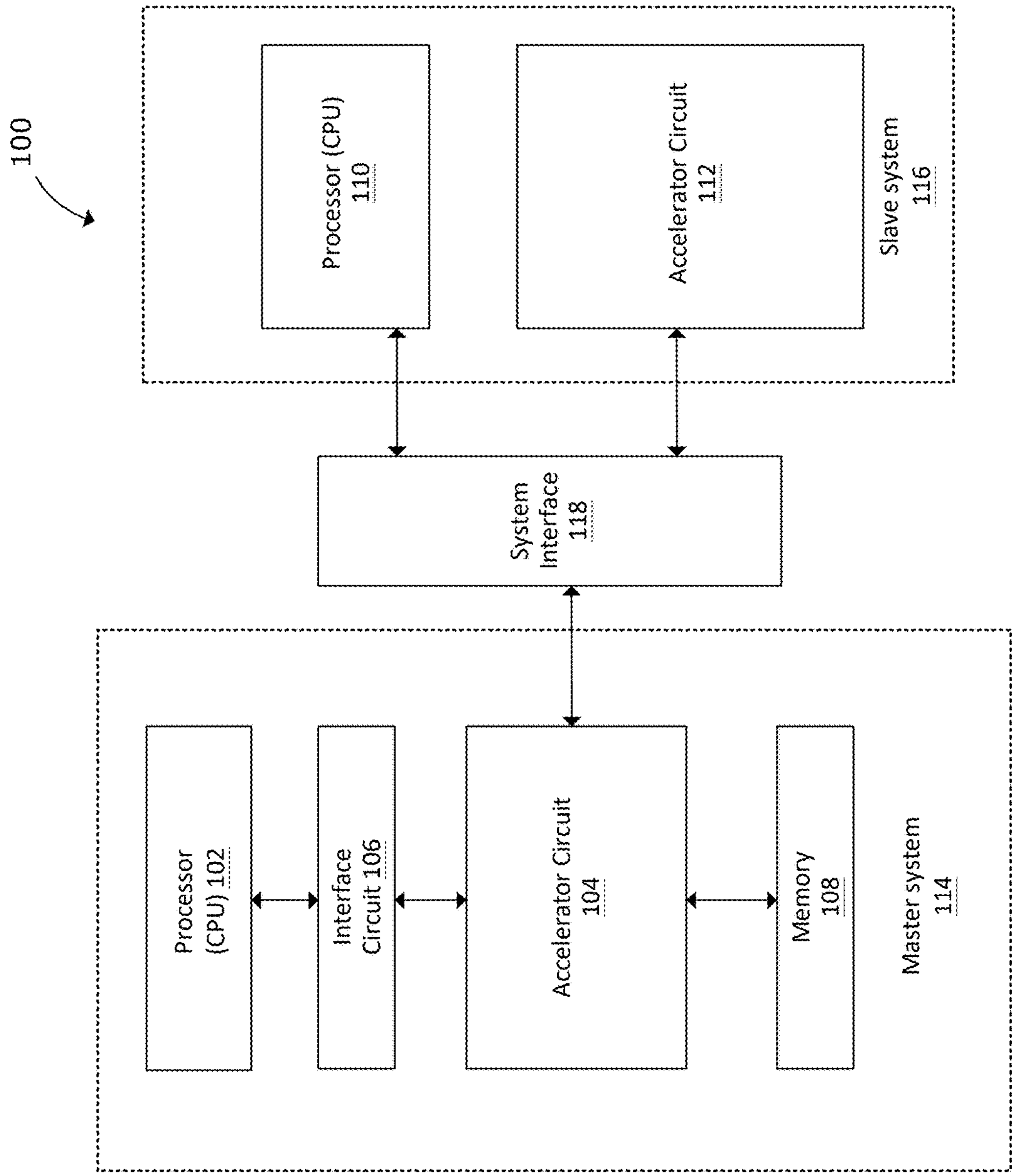
FIG. 1 illustrates a system including an accelerator circuit according to an implementation of the disclosure.

Processors, in particular, tensor processors may be employed to perform complex calculations such as, for example, the neural network applications. Neural networks are widely used in artificial intelligence (AI) applications. The neural networks in this disclosure are artificial neural networks which may be implemented on electrical circuits to make decisions based on input data. A neural network may include one or more layers of nodes. The layers can be any of an input layer, hidden layers, or an output layer.

The input layer may include nodes that are exposed to the input data, and the output layer may include nodes that are exposed to the output. The input layer and the output layer are visible layers because they can be observed from outside the neural network. The layers between the input layer and the output layer are referred to as hidden layers. The hidden layers may include nodes implemented in hardware to perform calculations propagated from the input layer to the output layer. The calculations may be carried out using a common set of pre-determined functions such as, for example, filter functions and activation functions. The filter functions may include multiplication operations and summation (also referred to as reduction) operations. The activation function can be any one of an all-pass function, a sigmoid function (sig), or a hyperbolic tangent function (tanh).

In some implementations, the CPU may delegate the GPU to perform the computations relating to the neural network or other computation-intensive tasks. In other implementations, accelerator circuits coupled to the CPU may be implemented to take over the work load of the GPU. An accelerator circuit may include special-purpose hardware circuitry fabricated for accelerating the calculations of the neural network computation. Although the accelerator circuits are currently implemented either in cloud ends or at the device ends may carry out high-performance calculations at relative lower costs compared to the GPUs, these implementations of accelerator circuits, compared to the GPUs, are not integrated with the programming interface of the CPU and are thus more difficult to debug by programmers.

To overcome the above-identified issues and other deficiencies of the current implementations of the accelerator circuits, the present disclosure provide technical solutions that include implementations of the accelerator circuit within a purely functional framework that allows the direct programming of the accelerator circuits and the convenience for debugging. The purely functional framework treats all computation similar to the evaluation of mathematical functions. By definition, the purely functional framework guarantees that the results of the execution of an instruction within the framework only depend on its arguments regardless of the status of any global or local states. Thus, the results of the executions of instructions within the framework are determined by the input values.

The architectural implementation of the purely functional framework provides certain technical characteristics. All instructions within the framework are memory-to-memory instructions that can be treated as a pure function. A memory-to-memory instruction retrieves data from a first memory, processes the data, and transfers the data to a second memory, where the first memory and the second memory can be identical (or at identical memory location) or different memories. An instruction within the framework can be a single pure function instruction, or a compound pure function constructed from single pure function instructions. Instructions within the framework may be executed in parallel to hide the phases of memory access. The CPU directly controls and monitors the flow of the instruction executions. The framework may provide custom call instructions that allow the accelerator circuits to work cooperatively with other programs executed by the CPU or by other accelerator circuits in another system (e.g., a slave system). The framework may also allow direct acceleration of the instruction without compiler optimization. Further, the framework may allow lazy evaluation (i.e., evaluation of a function when needed) and beta reduction (i.e., calculating the results using an expression input). With the lazy evaluation and beta reduction, the framework can achieve data locality (i.e., the ability to move the computation close to where the data resides on a node rather than moving a large amount of data to the computation location). The framework makes the control flow of the instructions and the behavior of the accelerator circuits observable through programs executed by the CPU with no effects exerted by external states. This ensures that the performance is certain and predictable in a given environment because of the characteristics of the pure function, thus making it easier for programmers to debug their applications.

The framework may provide a multiplication-addition-cumulation (MAC) matrix circuit that includes interconnected (non-separated) computation unit circuits. The CPU may reuse the MAC matrix circuit for convolution, dot product, pooling, and rectified linear units (ReLU) calculations. The framework may allow four-dimensional organized local data layout and three-dimensional organized MAC matrix to further enhance the capability of the system.

The CPU may execute instructions targeted towards an accelerator circuit. In one implementation, the instruction may be constructed to include four (4) parts: an operation part, a global information part, a local information part, and an internal memory allocation part. The operation part may specify the functionality that the accelerator circuit is to perform. Specifically, the operation part may include a computation field specifying one of a multiplication-addition-cumulation (MAC), a max pooling, or a rectified linear unit (ReLU) calculation.

The global information part may specify parameter values that affect a tensor data as a whole such as, for example, the start point, width, height etc. The global information may include four tensors including an input feature map (base, global width, area=global width*global height), a kernel (base, kernel width, kernel height, kernel area=kernel width*kernel height, input kernel size=kernel width*kernel height*global input channels), a partial sum (base, global width (shared with output), global width*global height (shared with output)), and an output feature map (base, global width, global width*global height) as well as a metadata base.

The local information part may specify the dimension values associated with partitions of tensor data such as, for example, the partition width, the partition height, the number of channels associated with the partition etc. Additionally, the local information part may specify the hardware execution preferences to allow the instruction to choose parallel execution on a certain dimension. The local information may include four tensors including a partial sum shared with the output feature map (width before decimation, local width, local width*local height, local output channels), a kernel map (input kernel map size=kernel width*kernel height*local input channels), an input feature map (delta width=input local width–output local width, delta height=input local height–output local height, local input channels), and hardware partitions (partitions of computation units).

The internal memory allocation part may specify the memory banks used for the instruction. The internal memory allocation may include local memory bank identifiers where each identifier is an operand such as, for example, input feature maps, boundary feature maps, kernel maps, partial sum maps, and output feature maps as tensor, vector, or scalar banks. The internal memory allocation information may also include a reuse flag and a no-synchronization flag that are used to combine instructions to form a new complex pure function while saving unnecessary data transfer. The internal memory allocation information may also include a local memory data type to indicate the data type of the operand in the local memory.

The execution of each instruction may include three phases of direct memory access (DMA) input, computation, and DMA output. In the DMA input phase, the accelerator circuit may load the data directly from external memory to local memory associated with the accelerator circuit using a DMA mode. In the computation phase, the accelerator circuit may read the data from the local memory from a source location, perform the calculation, and write the results back to the local memory to a destination location in the local memory. In the DMA output phase, the accelerator circuit may transfer the result data stored in the local memory to the external memory in the DMA mode.

In one implementation, the framework may allow execution of a virtual instruction. A virtual instruction is an instruction that does not have a limit on the size parameters (e.g., width, length, or number of channels). This can be achieved by removing the local information part. The internal memory allocation can be extended to a larger number of memory banks, and each memory bank is to support the holding of the global size of data.

FIG. 1 illustrates a system 100 including an accelerator circuit according to an implementation of the disclosure. System 100 may include a master system 114 and a slave system 116. In one implementation, master system 114 and slave system 116 may be configured with identical components, and the roles of master and slave can be interchanged. Alternatively, slave system 116 may be configured with a subset of components of master system 114 to support the computation carried out by master system 114. In another implementation, system 100 may include only a stand-alone master system 114 without slave system 116.

Master system 114 may include a hardware processor (e.g., CPU or GPU) 102, an accelerator circuit 104, and an interface circuit 106 that communicatively connects processor 102 to accelerator circuit 104. Further, master system 114 may include a memory 108 that is external to accelerator circuit 104 for storing data.

In one implementation, master system 114 can be a computing system or a system-on-a-chip (SoC). Processor 102 can be a hardware processor such as a central processing unit (CPU), a graphic processing unit (GPU), or any suitable types of processing device. Processor 102 may include an instruction execution pipeline (not shown), a register file (not shown), and circuits implementing instructions specified according to an instruction set architecture (ISA).

In one implementation, processor 102 can be a vector/tensor processor that includes a vector/tensor instruction execution pipeline (not shown), a vector/tensor register file (not shown), and circuits implementing vector/tensor instructions specified according to a vector/tensor instruction set architecture (ISA). The vector/tensor instructions may operate on vectors/tensors containing a certain number of data elements. For concise description, the disclosure will refer both a scalar and vector processor as a processor herein. Thus, a processor can be understood as a scalar processor or a vector processor unless otherwise explicitly specified.

Memory device 108 may include a storage device communicatively coupled to processor 102 and accelerator circuit 104. In one implementation, memory device 108 may store input data for a neural network application and output data generated by the neural network application. The input data can be a feature map (one or more dimensions) including feature values extracted from application data such as, for example, image data, speech data, Lidar data etc., and the output data can be decisions made by the neural network, where the decisions may include classification of objects in images into different classes, identification of objects in images, or recognition of phrases in speech.

Accelerator circuit 104 may be communicatively coupled to processor 102 and memory device 108 to perform the computationally-intensive tasks using the special-purpose circuits therein. In the following, processor 102 may also be referred to as a host of accelerator circuit 104. Accelerator circuit 104 may perform these tasks on behalf of processor 102. For example, processor 102 may be programmed to break down a neural network application into multiple (hundreds or thousands) calculation tasks and delegate the performance of these tasks to accelerator circuit 104. After the completion of these tasks by accelerator circuit 104, processor 102 may receive the calculated results in return. The accelerator circuit 104 can be an application specific integrated circuit (ASIC), a field programmable gate array (FPGA), a digital signal processor (DSP), network processor, or the like. In one implementation, accelerator circuit 104 is implemented within the purely functional platform so that instructions issued by processor 102 to accelerator circuit 104 are executed as pure functions. Thus, the outputs generated by executing the instruction on accelerator circuit 104 depends only on the input values. The purely functional implementation of accelerator circuit 104 allows programmers visibility to the control flow of instruction execution and ability to debug the neuron network applications executed by processor 102. A detailed description of accelerator circuit 104 is provided in the following in conjunction with FIG. 2.

Interface circuit 106 can be a general bus interface implemented to transmit instructions and data from processor 102 to accelerator circuit 104 and/or memory 108. For example, processor 102 may employ interface circuit 106 to issue instructions to accelerator circuit 104, and generate control signals to memory 108 to cause DMA read from memory 108 and DMA write to memory 108.

In certain situations, as shown in FIG. 1, accelerator circuit 104 of master system 114 may request assistance from slave system 116. Master system 114 may be connected to slave system 116 through a system interface 118. Accelerator circuit 104 of master system 114 may, through system interface 118, issue instructions to processor (CPU, GPU) 110 of slave system 116 and/or issue instructions directly to accelerator circuit 112 of slave system 116. In this way, master system 114 may use slave system 116 to further enhance its computational capability.

Figure 2:
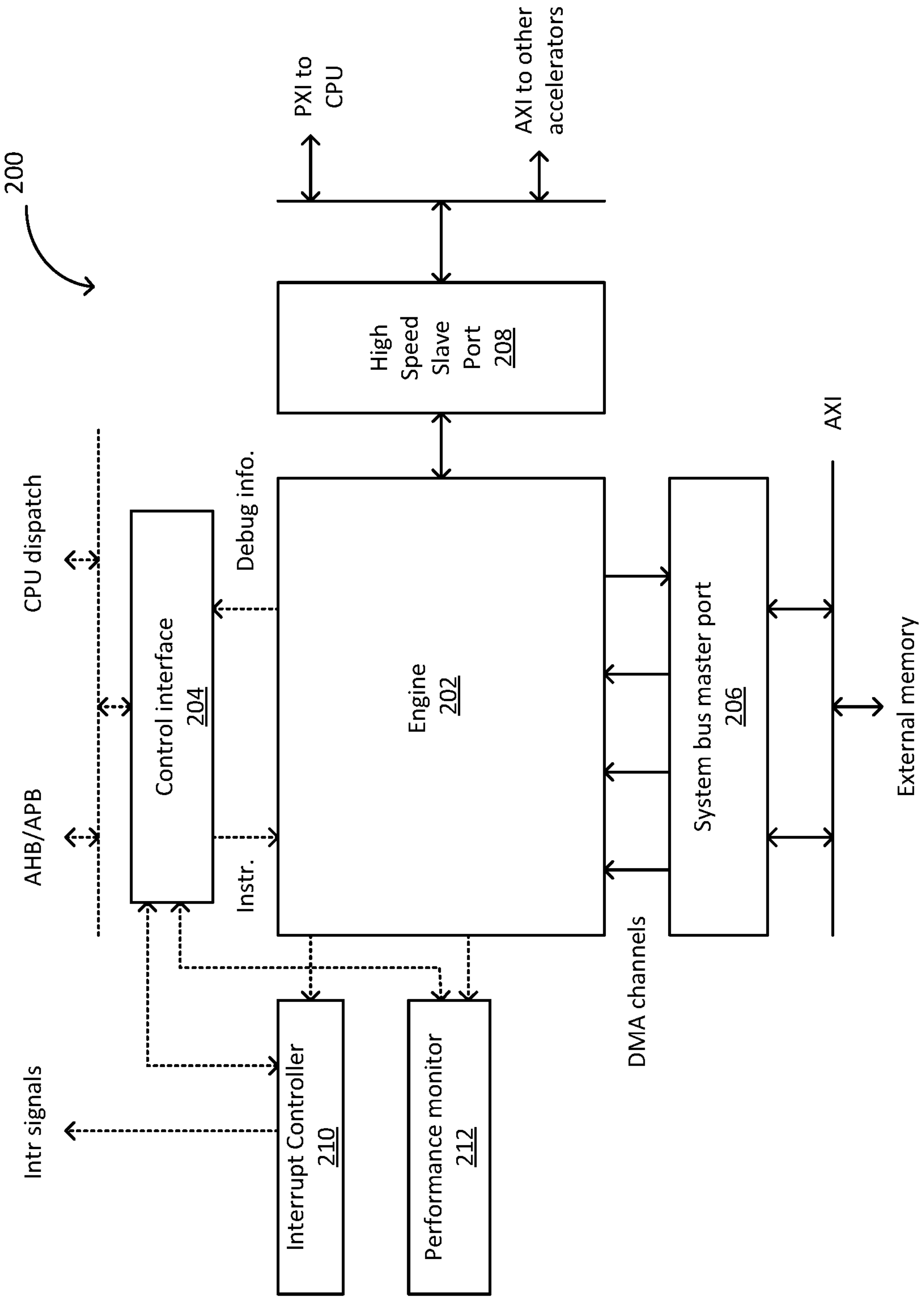
FIG. 2 illustrates a schematic diagram of an accelerator circuit according to an implementation of the disclosure.

FIG. 2 illustrates a schematic diagram of an accelerator circuit 200 according to an implementation of the disclosure. As shown in FIG. 2, accelerator circuit 200 may include an engine circuit 202, a control interface 204, a system bus master port 206, an interrupt controller 210, and a performance monitor 212. Accelerator circuit 200 may optionally include a high-speed slave port 208 to connect to another slave system.

Engine circuit 202 may include instruction parsing and dispatch circuit, asynchronized command queues, a neuron matrix command execution circuit, registers, and local memory banks. At the direction of an instruction issued by a processor (e.g., a CPU, GPU), engine circuit 202 may perform calculations for the processor in a purely functional platform under which the output results generated by the engine circuit 202 depend only on the input values. The calculations performed by engine circuit 202 may include convolution, dot product, ReLU etc. A detailed description of engine circuit 202 is provided in conjunction with FIG. 3.

Control interface 204 may connect engine circuit 202 to a processor (CPU, GPU) of a host so that the processor of the host can issue instructions to engine circuit 202. In one implementation, control interface 204 may be directly connected to the instruction execution pipeline to receive the instructions and configuration data directed to engine circuit 202. In another implementation, control interface 204 is connected to the general bus system of the host to receive the instructions and configuration data directed to engine circuit 202. In both implementations, the instructions and configuration data directed to engine circuit 202 may be identified by an identifier associated with engine circuit 202. Responsive to receiving the instructions from the processor of the host, control interface 204 may pass the instructions received from the processor to engine circuit 202. Responsive to receiving the configuration data, control interface 204 may set the configuration of interrupt controller 210 and performance monitor 212.

System bus master port 206 is an interface for connecting an external memory (external to accelerator circuit 200). The external memory may store input values that may be transferred to the local memory of engine circuit 202 using the direct-memory access (DMA) input channels, and transfer output results using the DMA output channels from the local memory to the external memory. The DMA input/output may transfer data between the local memory and the main memory independent of the processor of the host, thus reducing the burden of data transfer exerted on the processor of the host. In one implementation, depending on the configuration of the system, system bus master port 206 may be one or two Advanced Extensible Interface (AXI) ports.

High speed slave port 208 is an interface for connecting engine circuit 202 of accelerator circuit 200 to a slave system. The high speed slave port 208 may facilitate the exchange of data between internal memory in engine circuit 202 and an internal memory of the slave system without passing through the main external memory, thus achieving low-latency data transmission between the master system and the slave system.

Performance monitor 212 may include circuit logic to monitor different performance parameters associated with engine circuit 202. Control interface 204 may receive configuration data that may be used to set and unset the performance parameters to be monitored. The performance parameters may include the utilization rate for data transmission and the utilization rate for the neuron matrix command execution circuit within engine circuit 202. The utilization rate for data transmission may measure the amount of data transferred between engine circuit 202 and external memory in view of the channel bandwidth. The utilization rate for the neuron matrix command execution circuit may measure the number of active neuron within the neuron matrix command execution circuit in view of the total number of neurons in the matrix. Performance monitor 212 may feedback these performance parameters through control interface to the processor of the host.

Interrupt controller 210 may generate interrupt signals to the host in response to detecting that a high-priority event associated with engine circuit 202 has occurred. The high-priority events may include a hardware error (or failure) associated with engine circuit 202. Other high-priority events may include command complete, command buffer full or empty events. The interrupt signals may be transmitted to an interrupt handler of the host, where the interrupt handler may further process the interrupt signal on behalf of the processor of the host. For example, the interrupt handler may suspend the current task performed by the processor and direct the processor to handle the interrupt. Alternatively, the interrupt handler may mask the interrupt signal without notifying the processor. In one implementation, control interface 204 may receive configuration data for interrupt controller 210 and set up interrupt controller 210 based on the configuration data. For example, the configuration data may be used to set up flags stored in an interrupt status register. Each flag may correspond to a specific interrupt event. When a flag is set, interrupt controller 210 may forward the interrupt signal corresponding to the interrupt event to the host. When the flag is unset, interrupt controller 210 may ignore the interrupt event and decline to forward the interrupt signal to the host.

As discussed above, engine circuit 202 may receive instructions through control interface 204 from the processor of the host. Some of the instructions may direct engine circuit 202 to perform certain computation tasks (e.g., convolution, dot product, or ReLU). Other instructions may insert check points in the instruction execution streams to provide debug information through control interface 204 back to the processor of the host.

The engine circuit is the part of accelerator circuit that performs data loading, processing, and storing tasks. To this end, engine circuit may be implemented to have two information flows. The first flow (referred to as the "control plane" represented using dashed lines in FIG. 3) may manage the stream of instructions received by control interface. The second flow (referred to as the "data plane" represented by the solid lines in FIG. 3) may manage the data elements of vector/tensor.

Figure 3:
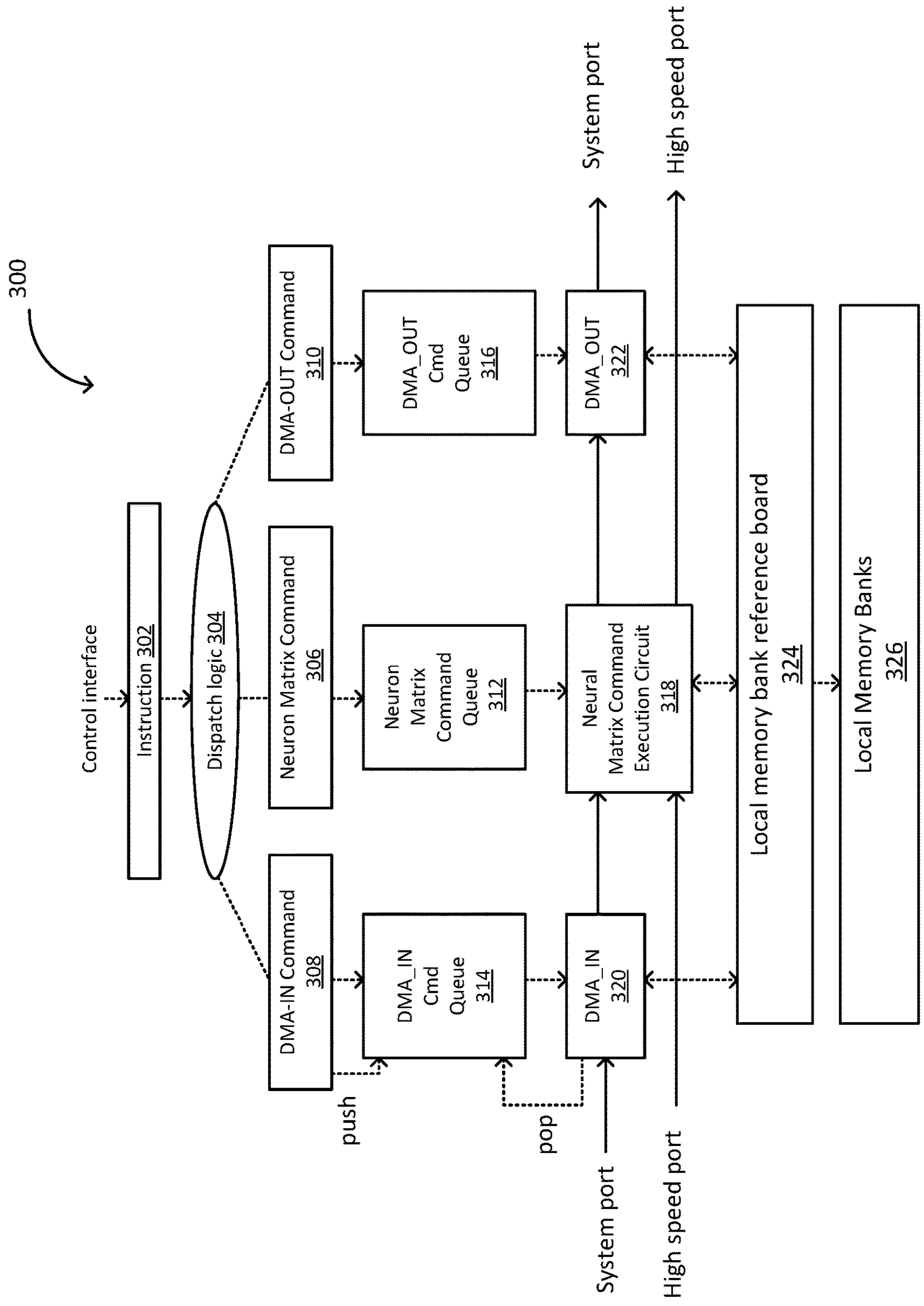
FIG. 3 illustrates a schematic diagram of an engine circuit according to an implementation of the disclosure.

FIG. 3 illustrates a schematic diagram of an engine circuit 300 according to an implementation of the disclosure. Referring to FIG. 3, engine circuit 300 may include hardware components of a dispatch logic 304, a neuron matrix command queue 312, a DMA input command queue 314, a DMA output command queue 316, a neuron matrix command execution circuit 318, a DMA input command execution circuit 320, a DMA output instruction execution circuit 322, a local memory bank reference board 324, and local memory banks 326. For the control plane, dispatch logic 304 may receive an instruction 302 from the control interface. As discussed above, instruction 302 may include four parts of an operation part, a global information part, a local information part, and an internal memory allocation part.

Dispatch logic 304 may parse information associated with an instruction in an instruction stream issued by the processor of the host, and based on the information extracted from the four parts, generate three commands for the instruction. The three commands may include a DMA input command 308, a neuron matrix command 306, and a DMA output command 310. These three commands respectively correspond to the DMA input phase, the computation phase, and the DMA output phase of the instruction execution. Dispatch logic 304 may place DMA input command 308 in DMA input command queue 314, place neuron matrix command 306 in neuron matrix command queue 312, and place DMA output command 310 in DMA output command queue 316. In one implementation, DMA input command queue 314, neuron matrix command queue 312, and DMA output command queue 316 are implemented using stack data structures stored in storage devices (e.g., local registers, local memory). DMA input command queue 314, neuron matrix command queue 312, and DMA output command queue 316 may be implemented as a first-in-first-out (FiFo) queue with a number of entries (e.g., 16 entries in each queue). The FiFo queues ensure that the commands in any one of the three queues are issued sequentially in the order they are placed in the queue. However, there is no requirement for the three commands derived from a same instruction to be executed in sync. Thus, commands in different queues even though they had been derived from a common instruction may be issued out of order. Namely, a command in a queue from a later instruction in the instruction stream may be issued earlier than another command in another queue from an earlier instruction in the instruction stream. The utilization of three queues allows the different commands derived from different instructions to be executed concurrently. This feature enables data preloading (e.g., loading data to the local memory bank prior to the neuron matrix command using the data is issued), thus hiding the memory latency and improving the overall performance of engine circuit 300.

DMA input command execution circuit 320 may receive a DMA input command 308 extracted from DMA input command queue 314 and execute the DMA input command 308; neuron matrix command execution circuit 318 may receive a neuron matrix command 306 extracted from neuron matrix command queue 312 and execute the neuron matrix command 306; DMA output command execution circuit 322 may receive a DMA output command 310 extracted from DMA output command queue 316 and execute the DMA output command 310. Local memory bank reference board 324 may include a logic circuit to ensure that although DMA input command 308, neuron matrix command 306, and DMA output command 310 of an instruction are executed in an asynchronized manner, the results of the executions are correct.

In one implementation, local memory bank reference board 324 may include counters implemented in hardware responsible for ensuring commands with interlocking dependencies to be executed in the correct order. Local memory bank reference board 324 may generate signals that control the read and write operations to local memory banks 326. There are two types of dependencies including data dependency and resource dependency. The data dependency may include that the neuron matrix command 306 of an instruction may need the data provided by the DMA input command 308 of the same instruction; the neuron matrix command 306 may need data from the results of a previous neuron matrix command executed by the same neuron matrix command execution circuit; DMA output command 310 of an instruction may need the data from the neuron matrix command 306 of the same instruction. Resource dependency may include that DMA input command 308 cannot write to a local memory bank because the memory bank is being read by neuron matrix command 306 or being output by DMA output command 310 to the external memory; neuron matrix command cannot write to a local memory bank because the memory bank is being output by DMA output command 310 to the external memory.

Figure 4:
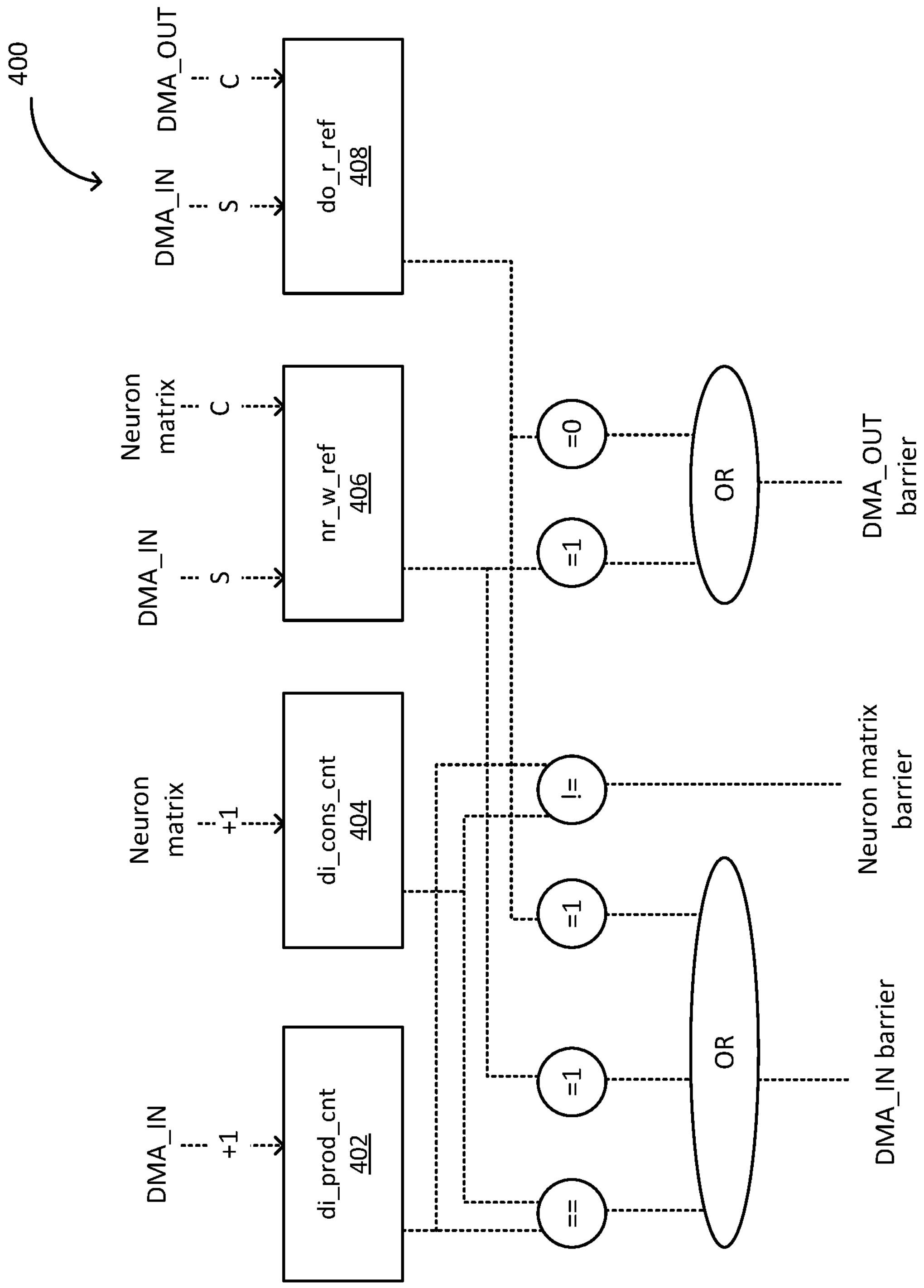
FIG. 4 illustrates a schematic diagram of a local memory reference board according to an implementation of the disclosure.

FIG. 4 illustrates a schematic diagram of a local memory reference board 400 according to an implementation of the disclosure. Local memory reference board 400 may include hardware counters to ensure the correct order of command execution based on the data dependencies and resource dependencies. Referring to FIG. 4, local memory reference board 400 may include counters 402, 404, and reference registers 406, 408 that may be used to generate signals to control the read and write operations to the local memory bank 326.

In one implementation, each memory bank in local memory banks 326 may be provided with a DMA input barrier signal, a neuron matrix barrier signal and a DMA output barrier signal. These barrier signals may determine whether the memory bank can be read or write. DMA input command execution circuit 320 may cause an increment of counter 402 (di_prod_cnt) by one in response to determining that DMA input command execution circuit 320 finishes the data transmission to a memory bank, indicating that there is a new read reference (or an address pointer) to the memory bank. Neuron matrix command execution circuit 318 may cause an increment of counter 404 (di_cons_cnt) in response to determining that neuron matrix command execution circuit 318 is done reading the memory bank. When the value (di_prod_cnt) stored in counter 402 equals the value (di_cons_cnt) stored in counter 404, the references produced by DMA input command execution circuit 320 are all consumed by neuron matrix command execution circuit 318. In this situation, neuron matrix command execution circuit 318 needs to wait for more new references. When the value (di_prod_cnt) stored in counter 402 does not match the value (di_cons_cnt) stored in counter 404, the references produced by DMA input command execution circuit 320 before have not consumed by neuron matrix command execution circuit 318 and DMA input command execution circuit 318 needs to wait. A special situation is when a reuse flag associated with the memory bank is set, DMA input command execution circuit 320 may cause an increment of counter 402 without waiting for all previous references to be consumed. This allows the execution of more DMA input commands in advance.

DMA input command execution circuit 320 may set reference register 406 (nr_w_ref) when the DMA input command execution circuit 320 starts to reserve the access right to the memory bank for saving the calculation results. This marks the start point of the execution of the instruction. The reference register 406 may be cleared by neuron matrix command execution circuit 318 when the calculation results are saved to the memory bank. DMA input command execution circuit 320 or neuron matrix command execution circuit 318 may set reference register 408 (do_r_ref), indicating that the data stored in the memory bank is being transferred to the external memory. DMA output command execution circuit 322 may clear reference register 408, indicating that the data had been transferred out to the external memory and the memory bank is released.

Counters 402, 404, and reference registers 406, 408 are provided for each local memory bank. Thus, all commands must check all barrier signals prior to execution. As shown in FIG. 4, DMA input barrier signal is set by any one of the conditions: (1) di_prod_cnt==di_cons_cnt; or rn_w_ref is set to 1; or do_r_ref is set to 1. Neuron matrix barrier signal is set if di_prod_cnt!=di_cons_cnt. DMA output barrier signal is set by any one of the conditions: (1) nr_w_ref=1; or (2) do_r_ref=0. The barrier signal may prevent the execution of a corresponding command. For example, when DMA input barrier signal is set, DMA command execution circuit 320 may suspend access to the memory bank; when neuron matrix barrier signal is set, neuron matrix command execution circuit 318 may suspend access to the memory bank; when DMA output barrier signal is set, DMA output command execution circuit 322 may suspend access to the memory bank.

The example implementation shown in FIG. 4 includes only one neuron matrix command execution circuit and one DMA output command execution circuit. Therefore, reference registers 406, 408 include only one bit flag that can be set to one or unset to zero. Other implementations may include more than one neuron matrix command execution circuit or more than one DMA output command execution circuit, counters (like those 402, 404) can be used in place of the bit flags.

Referring to FIG. 3, there are two data flows for the data plane associated with the engine circuit. An active data flow may include the retrieving data from external memory to local memory banks 326 by executing DMA input command 308, processing the data by neuron matrix command execution circuit and storing the data back to the local memory banks 326, and writing data out to external memory by executing DMA output command 310. The active data flow is controlled by the engine circuit 300 with all requests being issued by the engine circuit 300. A passive data flow includes data flowing for neuron matrix command execution circuit 318 to retrieve data from the internal memory and to store results in the internal memory.

Figure 5:
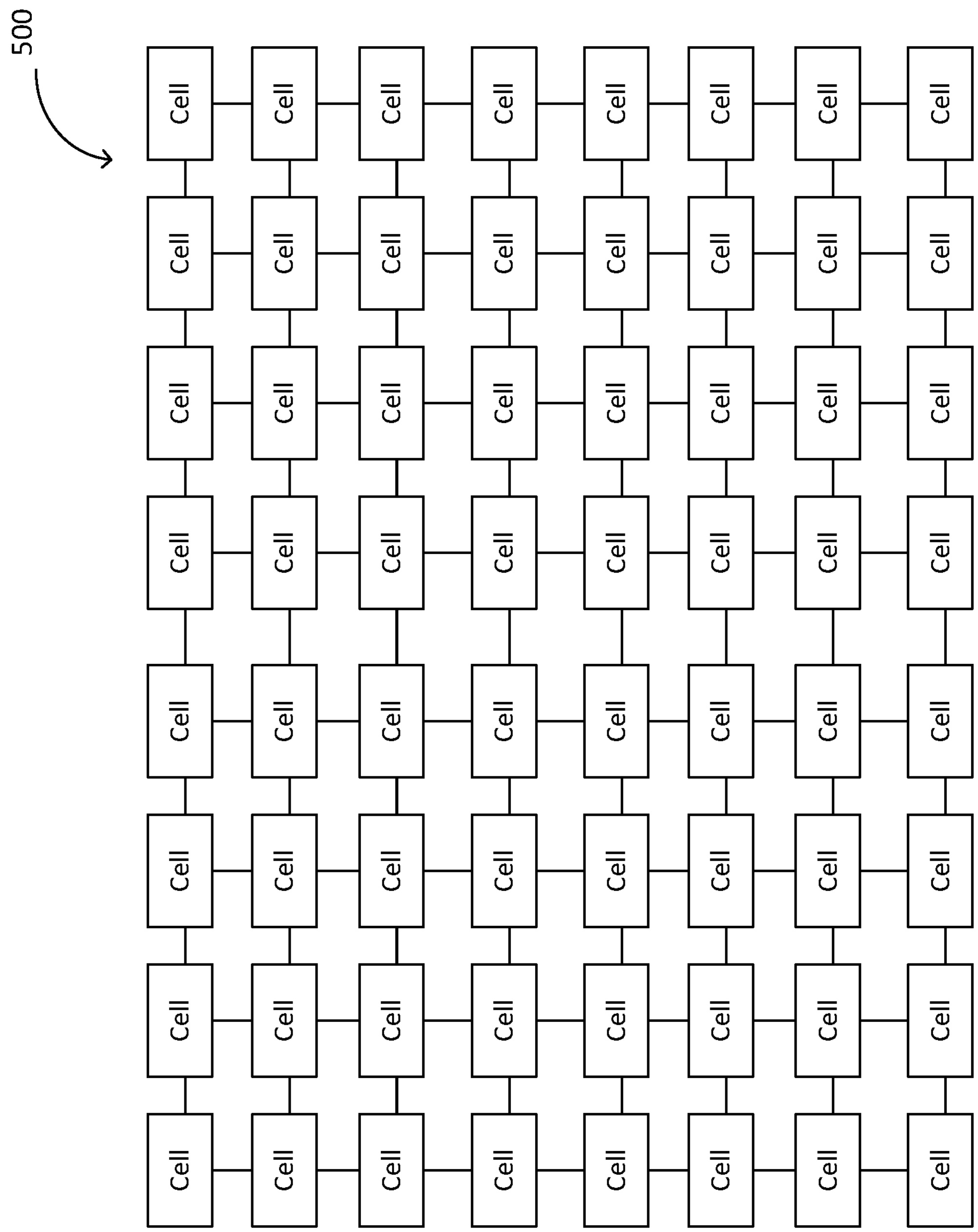
FIG. 5 illustrates a matrix of computation cells according to an implementation of the disclosure.

Neuron matrix command execution circuit may perform the operations specified by the operation code (opcode) in the operation part of the instruction. Neuron matrix command execution circuit may include a matrix of computation cells and a barrier signal control logic. FIG. 5 illustrates a matrix of computation cells 500 according to an implementation of the disclosure. The matrix can be a square matrix with equal numbers of cells along the x and y dimensions or a rectangular matrix with unequal numbers of cells along the x and y dimensions. As shown in FIG. 5, cells within the two-dimensional array are connected in the horizontal (x) and vertical (y) dimensions. Each cell may include a set of dimension counters, feeder circuits, a writer circuit, an array of computation units, and a set of local memory banks. Thus, the matrix of cells where each cell includes an array of computation units are particularly suitable for performing tensor computation. A tensor data object is a data cube that is indexed along three dimensions while an array object is a data array that is indexed along two dimensions.

Figure 6:
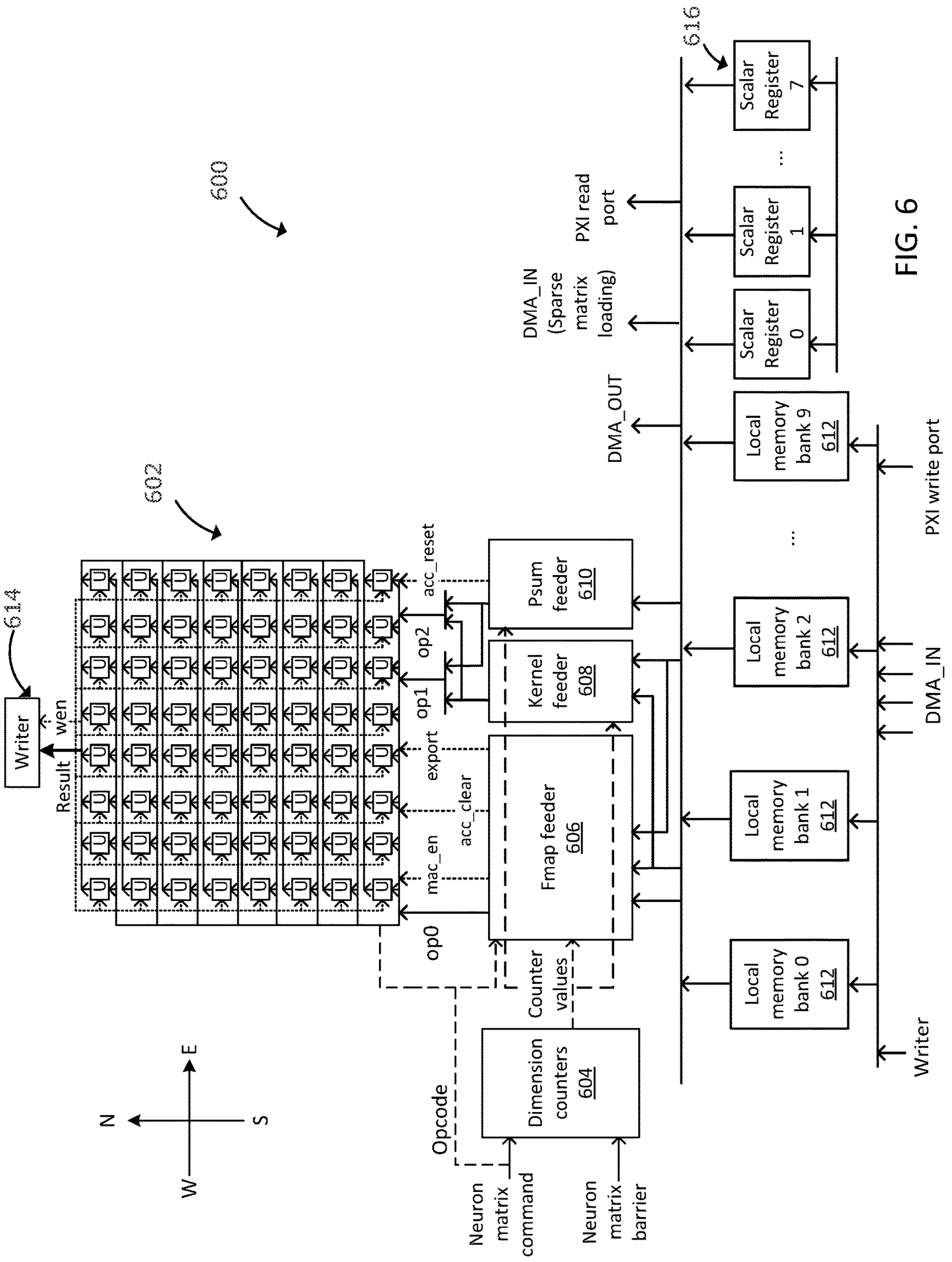
FIG. 6 illustrates a schematic diagram of a computation cell according to an implementation of the disclosure.

Each computation cell may be configured to perform a vector operation using the array of computation units therein. FIG. 6 illustrates a schematic diagram of a computation cell 600 according to an implementation of the disclosure. Referring to FIG. 6, computation cell 600 may include an array of computation units (each unit represented by a U) 602 and control logic circuits. The control logic circuits may include dimension counters 604, three feeder circuits 606, 608, 610, local memory banks 612, a writer circuit 614, and scalar registers 616. Computation cell 600 may operate on data stored in the local memory based the neuron matrix command and neuron matrix barrier signal directed to the cell. Each computation unit is a single circuit block that may perform a type of calculation under the control of one or more control signals. The control signals can be grouped into two groups. The first group of control signals are generated by decoding the neuron matrix command and are independent from the internal elements of the cell in the sense that the first group of control signals are set once the neuron matrix command is issued to the neuron matrix command execution circuit. The first group of control signals are applied to all computation units. The second group of control signals are dynamically generated internally based on the values stored in dimension counters 604 by the first feeder circuit 606 (Fmap feeder). The second group of control signals may vary as applied to different computation units within the array. The second group of control signals may include, as discussed later, mac_en, acc_clear_en, export, acc_reset_en etc. These control signals are enabled when dimension counters cross the boundaries of a data structure (e.g., an array) to perform higher dimension operations such as, for example, 3D tensor, depth-wise, point-wise, element-wise etc. The second group of control signals may help ensure each computation unit has correct input/output values and correct calculation result with the two-dimensional array structure.

Dimension counters 604 may be used to count down different dimension values associated with the calculation. In one implementation, neuron matrix barrier signal may be provided to dimension counters 604 for enabling or disabling the computation cell. If the neuron matrix barrier signal is set (e.g., to 1), dimension counters may be disabled and prevented from access by the neuron matrix command. If neuron matrix barrier signal is not set (e.g., at 0), dimension counters may be initialized by the neuron matrix command. The neuron matrix command may provide dimension counters with initial values representing the heights and widths of the input data (referred to as the feature data) and the filter data (referred to as the kernel). The computation is to apply the filter (e.g., a high/low pass filter) onto the input data (e.g., a 2D image) using convolution.

Dimension counters 604 may include a kernel width counter, a kernel height counter, an input channel counter, an input area counter (height and/or width of the input), and an output channel counter. The kernel width counter and kernel height counter may store the width and height of the kernel. The input channel counter may specify the number of times to retrieve data from memory bank. For certain calculations, there may be a need to retrieve the input data multiple times because the size limitation of the computation unit. A large feature map may be partitioned into smaller portions that are processed separately. In such situation, the channel counter may store the number of portions associated with a feature map. The output channel counter may specify the memory bank to receive the output results. For example, the output channel counter may store the number of times to perform the convolution calculation on these portions of the feature map. The total amount of computation may be proportional to kernel width*kernel height*partition counter*input channel counter*output channel counter.

The values stored in dimension counters may be fed to feeder circuits 606, 608, 610. Feeder circuit 606 (Fmap feeder) may control the transfer of input data (feature map) from local memory banks 612. Feeder circuit 608 (kernel feeder) may control the transfer of the kernel from the local memory banks 612. Feeder circuit 610 (psum feeder) may control the transfer of the partial sum values in the local memory banks 612. Feeder circuit 606 may, based on values stored in dimension counters 604 and an opcode received from the neuron matrix command, supply operand values (op0s) to the computation units and control signals mac_en, acc_clear, and export. Feeder circuits 608, 610 may be combined to supply other two operands (op1s, op2s) to the computation units. Feeder circuit 610 may generate control signal acc_reset. The operand values op0s can be the reference to a local memory bank from which the feature map can be retrieved; the operand values op1s may be the reference to local memory banks that provide the kernel; the operand values op2s may be the reference to the local memory banks for storing the partial sums.

Control signals may be enabled and disabled based on values stored in dimension counters. When the kernel width counter or the kernel height counter stores a non-zero value, feeder circuit 606 may set mac_en signal, triggering a multiplication-addition-cumulation (MAC) operation. When the value in the kernel width counter is decreased, feeder circuit 606 may enable a shift-to-west signal, causing the values in the array of computation units 602 to shift to the west direction (N, S, E, W as shown in FIG. 6 respectively represent north, south, east, west direction). When the value in the kernel height counter is decreased, feeder circuit 606 may enable a shift-to-north signal, causing the values in the array of computation units 602 to shift to the north direction. When the value in the input channel counter is decreased, feeder circuit 606 may enable a feature-map-ready signal, indicating that the feature map is ready to be read by the array of computation units for calculation. When the value in the input area counter is decreased, feeder circuit 606 may enable acc_clear and export signals, causing the export of the results from computation units to the local memory banks and the clearing of the accumulators in the computation units.

Feeder circuit (Fmap feeder) controls the transfer of operands of feature map data and boundary feature map data from local memory banks into four types of buffers. The four types of buffers may include an operand buffer for supplying op0s to computation units, an east boundary buffer for supplying the eastern neighbor data value to the area holding the operand buffer, a south boundary buffer for supplying the southern neighbor data value to the area holding the operand buffer, and a corner (or southeast) boundary buffer for supplying the eastern neighbor data value to the area holding south boundary buffer.

Operand buffer and east boundary buffer may be implemented in three (3) levels. Level-0 buffer is used for the Fmap feeder to retrieve data (from local memory bank) to the level-0 buffer; level-1 buffer is used to hold the data for the north direction shifting; level-2 buffer is used to hold the data for east direction shifting. When the feature-map-ready signal is enabled for the first time, the Fmap feeder reads the data into level-0 buffer, and the Fmap feeder may push the data values in the level-0 buffer to the level-1 buffer and release the level-0 buffer for loading next block of data when the feature-map-ready signal is enabled again. Data values stored in the level-2 buffer are shifted to the west in response to enabling the shift-to-west signal. Fmap feeder may reload the data from the level-1 buffer and shift the data values in the level-1 buffer to the north by one row in response to enabling the shift-to-north signal. Although the multi-level buffer scheme may require more buffers, the multi-level buffer scheme may significantly reduce the amount of connection wires when there are thousands of computation units. Each buffer may be associated with bit flags that each identifies whether a row or a column is the last valid row or column. The rows or columns identified by the big flags as the last row or column may be automatically padded with zeros at the end when the data is shifted either to the north for a column or to the east for a row.

The address to access the local memory banks 612 may be calculated based on the input area (stride: 1), the input channel (stride: feature map height rounding to multiples of the cell height, where rounding ensures that data at the same position from different input channels are fed into the same unit), the feature map height counter, and the output channel.

Kernel feeder may control the transfer of the data in the local memory bank for kernel maps operand. The kernel feeder may include two levels of buffers, with the level-0 buffer holding a row of kernel elements from the memory bank and the level-1 buffer holding the duplicated element which is broadcasted to all units in the cell.

Psum feeder may control the transfer of the data in the local memory bank for partial sum maps operand. Psum feeder may include only one level of buffer.

Writer circuit 614 may control data output from computation units into the local memory banks. A computation unit may issue a write-enable (wen) signal to enable an activation unit in the writer and then write the output of the activation unit into local memory. The activation unit supports linear, ReLU, sigmoid and tanh functions.

Scalar registers 616 may be addressed and referenced in manner similar to local memory banks. The scalar registers 616 may store scalar values that may be applied to elements in a feature map. For example, a scalar register 616 may store a multiplier value that may be applied to each element in a feature map.

Example 1 is an accelerator circuit including a control interface to receive a stream of instructions, a first memory to store an input data, and an engine circuit including a dispatch circuit to decode an instruction of the stream of instructions into a plurality of commands, a plurality of queue circuits, each of the plurality of queue circuits supporting a queue data structure to store a respective one of the plurality of commands decoded from the instruction, and a plurality of command execution circuits, each of the plurality of command execution circuits to receive and execute a command extracted from a corresponding one of the plurality of queues.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An accelerator circuit, comprising:

a control interface to receive a stream of instructions;

a first memory to store an input data; and a hardware engine circuit, communicatively coupled to the control interface and the first memory, the hardware engine circuit comprising:

a dispatch circuit to decode an instruction from the stream of instructions into a plurality of commands;

a plurality of queue storage circuits, each of the plurality of queue storage circuits storing thereon a corresponding queue data structure comprising one or more commands respectively decoded from one or more instructions from the stream of instructions; and a plurality of command execution circuits, each of the plurality of command execution circuits to receive and execute a command provided by a corresponding respective one of the corresponding queue data structures, wherein the instruction comprises an operation part to specify an operation that a first command execution circuit of the plurality of command execution circuits is to perform, a global information part to specify dimension information of a tensor, a local information part to specify a partition of the tensor, and a local memory information part to specify one or more memory banks in the first memory allocated to the operation.

2. The accelerator circuit of claim 1, wherein the plurality of command execution circuits are to execute the plurality of commands decoded from the instruction without synchronization.

3. The accelerator circuit of claim 1, wherein the one or more commands comprise a sequence of commands decoded from the stream of instructions, and wherein each of the plurality of command execution circuits is to receive and execute, in order, the sequence of commands.

4. The accelerator circuit of claim 1, wherein the dispatch circuit is to decode the instruction from the stream of instructions into a direct memory access (DMA) input command corresponding to a data input phase, a neuron matrix command corresponding to a computation phase, and a DMA output command corresponding to an output phase.

5. The accelerator circuit of claim 4, wherein the plurality of queue storage circuits comprise a first queue storage circuit storing thereon a DMA input command queue, a second queue storage circuit storing thereon a neuron matrix command queue, and a third queue storage circuit storing thereon a DMA output command queue.

6. The accelerator circuit of claim 5, wherein the first command execution circuit is a neuron matrix command execution circuit to execute the neuron matrix command, and wherein the plurality of command execution circuits further comprise a DMA input command execution circuit to execute the DMA input command and a DMA output command execution circuit to execute the DMA output command.

7. The accelerator circuit of claim 6, wherein execution of the DMA input command causes a DMA read of the input data from a second memory external to the accelerator circuit to the first memory.

8. The accelerator circuit of claim 7, wherein the neuron matrix command execution circuit comprises:

a matrix of computation cells that each is connected to at least another computation cell of the matrix, wherein each computation cell performs a type of calculation under control of one or more control signals.

9. The accelerator circuit of claim 8, wherein each computation cell in the matrix of computation cells comprises:

an array of computation units;

a plurality of dimension counters;

a plurality of feeder circuits communicatively coupled to the array of computation units; and a plurality of local memory banks associated with the plurality of feeder circuits.

10. The accelerator circuit of claim 9, wherein the plurality of dimension counters comprise:

a kernel height counter to store a first height value of a kernel;

a kernel width counter to store a first width value of the kernel;

a feature map height counter to store a second height value of a feature map, wherein the feature map is part of the input data;

a feature map width counter to store a second width value of the feature map;

an input channel counter to store a first reference value to a first local memory bank in the plurality of local memory banks that stores the feature map; and an output channel counter to store a second reference value to a second local memory bank to store a result generated by the array of computation units.

11. The accelerator circuit of claim 10, wherein the operation is one of a multiplication-addition-cumulation (MAC), a maximum, or a rectified linear unit (ReLU) operation.

12. The accelerator circuit of claim 11, wherein the plurality of feeder circuits comprise:

a feature map feeder circuit to provide:

the feature map from the plurality of local memory banks to the array of computation units;

a MAC enabling signal that, when set, triggers the MAC operation;

an accumulation clear signal that, when set, clears an accumulator associated with at least one of the array of computation units; and an export signal that, when set, triggers a writer circuit to export the result to the second local memory bank;

a kernel feeder circuit to control a transfer of the kernel from the plurality of local memory banks to the array of computation units; and a partial sum feeder circuit to:

control a transfer of a partial sum from the plurality of local memory banks to the array of computation units, wherein the partial sum is generated by another accelerator circuit connected to the accelerator circuit; and trigger an accumulator reset signal to reset the accumulator.

13. The accelerator circuit of claim 12, wherein the feature map feeder circuit comprises:

an operand buffer to store operands assigned to different computation units of the array of computation units, wherein the operands are derived from the feature map;

an eastern boundary buffer to store eastern neighbor data of computation units eastern to a corresponding computation unit in the array of computation units, wherein the eastern neighbor data are to be transferred to the array of computation units;

a southern boundary buffer to store southern neighbor data of computation units southern to a corresponding computation unit in the array of computation units, wherein the southern neighbor data are to be transferred to the array of computation units; and a corner boundary buffer to store southeastern neighbor data of computation units southeastern to a corresponding computation unit in the array of computation units, wherein the southeastern neighbor data is to be transferred to the array of computation units.

14. The accelerator circuit of claim 13, wherein the feature map feeder circuit is to:

set the MAC enabling signal responsive to determining that the first width value stored in the kernel width counter is non-zero;

set a shift-to-west signal for the array of computation units responsive to determining a decrease of the first width value stored in the kernel width counter;

set a shift-to-north signal for the array of computation units responsive to determining a decrease of the first height value stored in the kernel height counter; and set a feature-map-ready signal responsive to determining a decrease of the first reference value stored in the input channel counter.

15. The accelerator circuit of claim 14, wherein the feature map feeder circuit is to:

responsive to setting the feature-map-ready signal, read the feature map from the plurality of local memory banks to the operand buffer;

responsive to reading the feature map from the plurality of local memory banks to the operand buffer, moving the operands stored in the operand buffer to the eastern boundary buffer and the southern boundary buffer and releasing the operand buffer;

decrease the first width value stored in the kernel width counter to set the shift-to-west signal;

decrease the first height value stored in the kernel height counter to set the shift-to-north signal; and responsive to setting the feature-map-ready signal again, read the feature map from the plurality of local memory banks to the operand buffer.

16. The accelerator circuit of claim 9, wherein each computation cell further comprises a plurality of scalar registers referable by the instruction, and wherein at least one of the plurality of scalar registers is to store a scalar value as a multiplier provided to at least one computation unit in the array of computation units.

17. The accelerator circuit of claim 1, further comprising:

a local memory reference board to manage data transfer between the first memory and the plurality of command execution circuits;

an interrupt controller to generate an interrupt signal to a host responsive to detecting an error in performance of the hardware engine circuit;

a performance monitor to monitor the performance of the hardware engine circuit;

a system bus master port communicatively coupled to a second memory external to the accelerator circuit; and a slave port communicatively coupled to a second accelerator circuit.

18. The accelerator circuit of claim 1, wherein the stream of instructions comprises a debug instruction, and wherein responsive to execution of the debug instruction, the hardware engine circuit is to provide debug information via the control interface to an external processor.

19. A system for performing a pure function calculation, comprising:

a processor; and the accelerator circuit of claim 1.

* * * * *